No. 687,168. Patented Nov. 19, 1901.
A. W. & A. H. ROOVERS.
COIN CONTROLLED DIE PRESS.
(Application filed May 14, 1901.)

(No Model.) 8 Sheets—Sheet 1.

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 2.
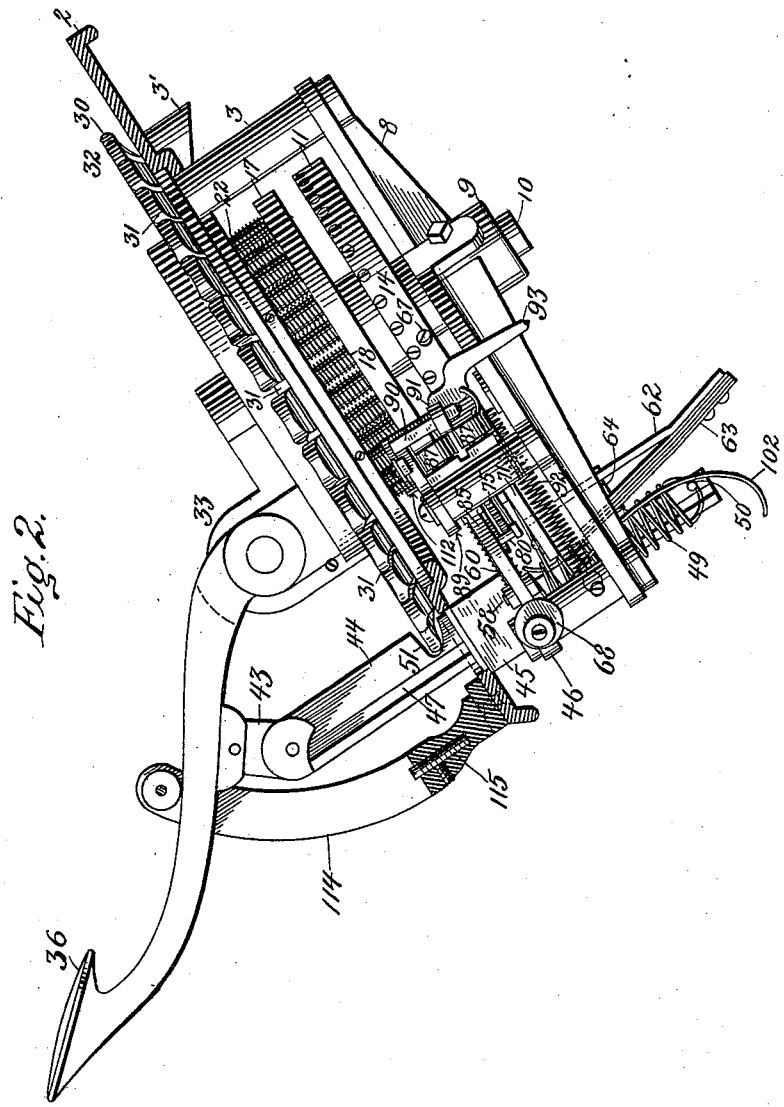

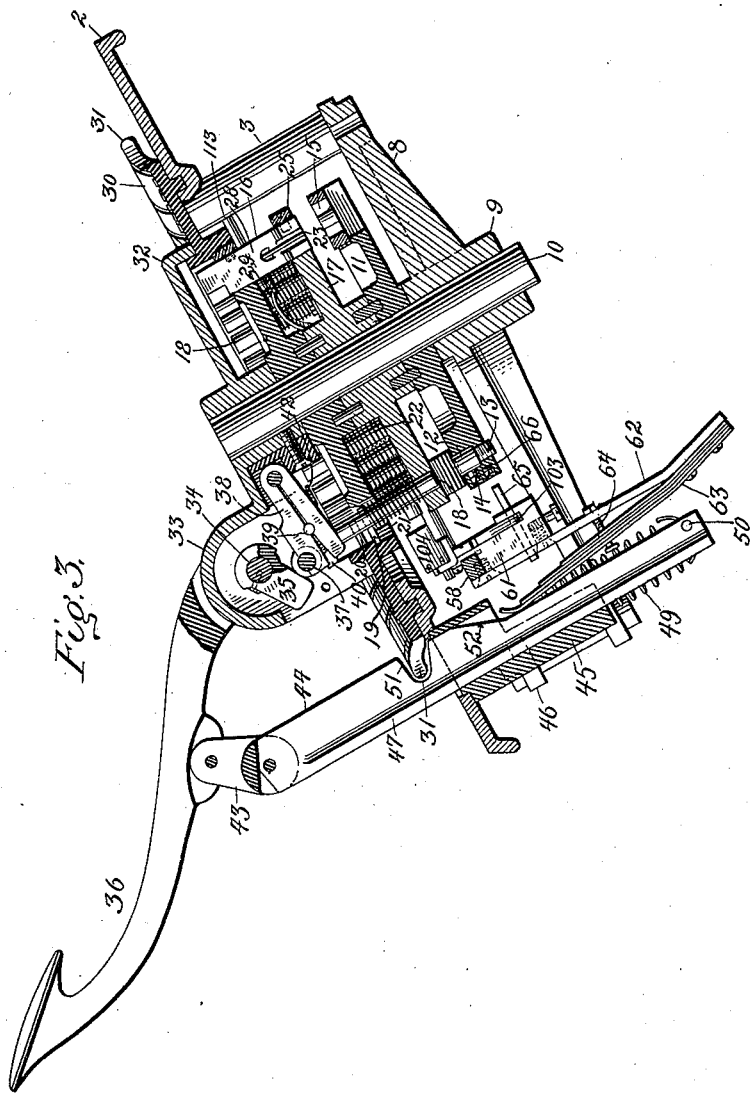

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 4.
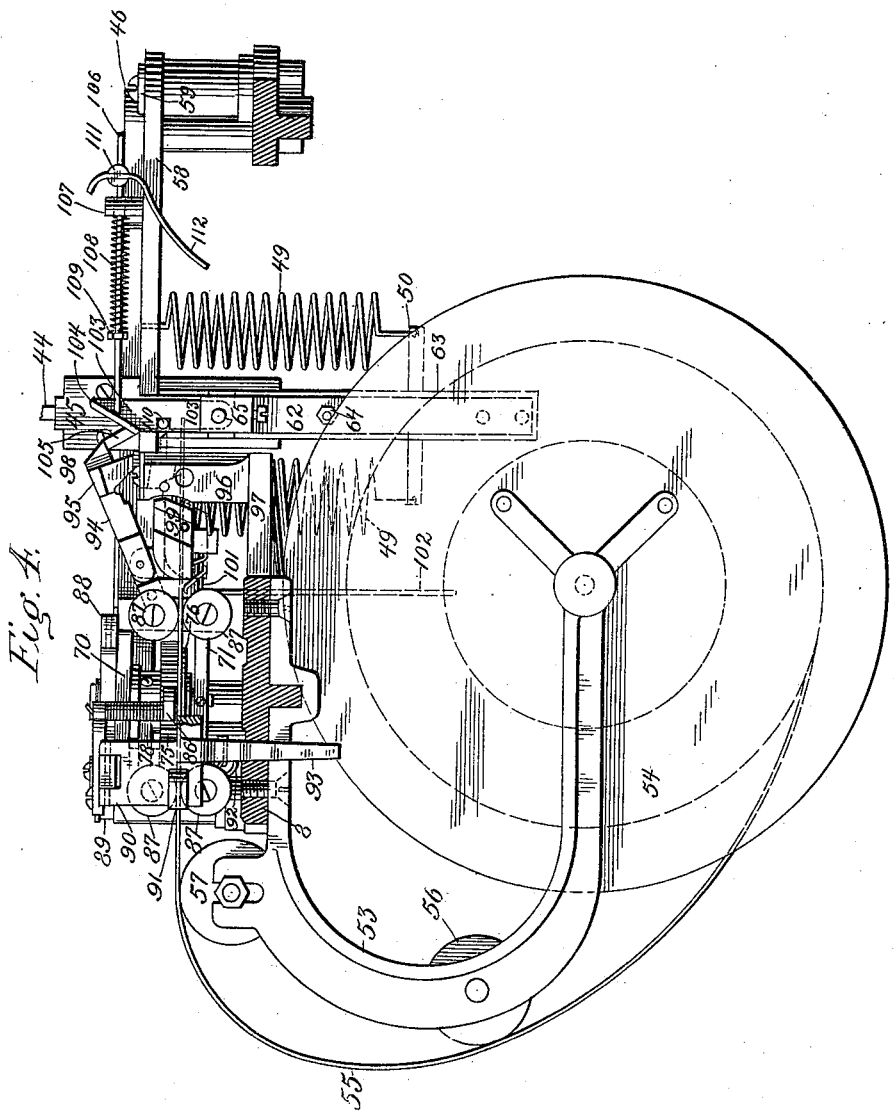

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 5.
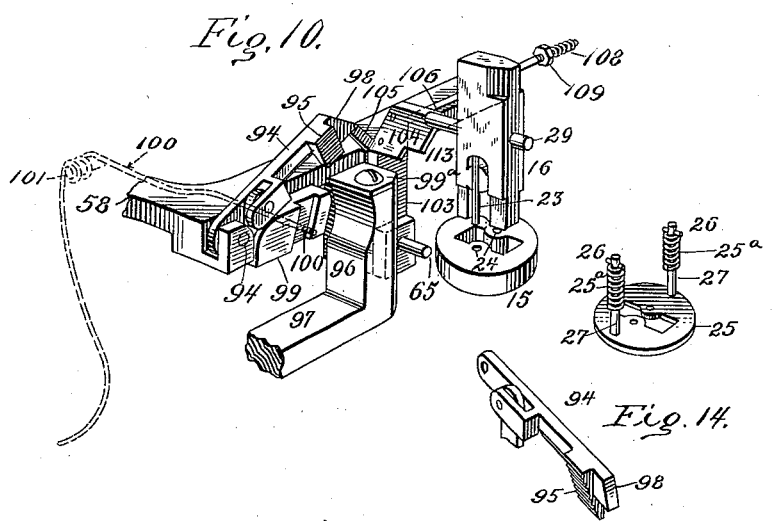
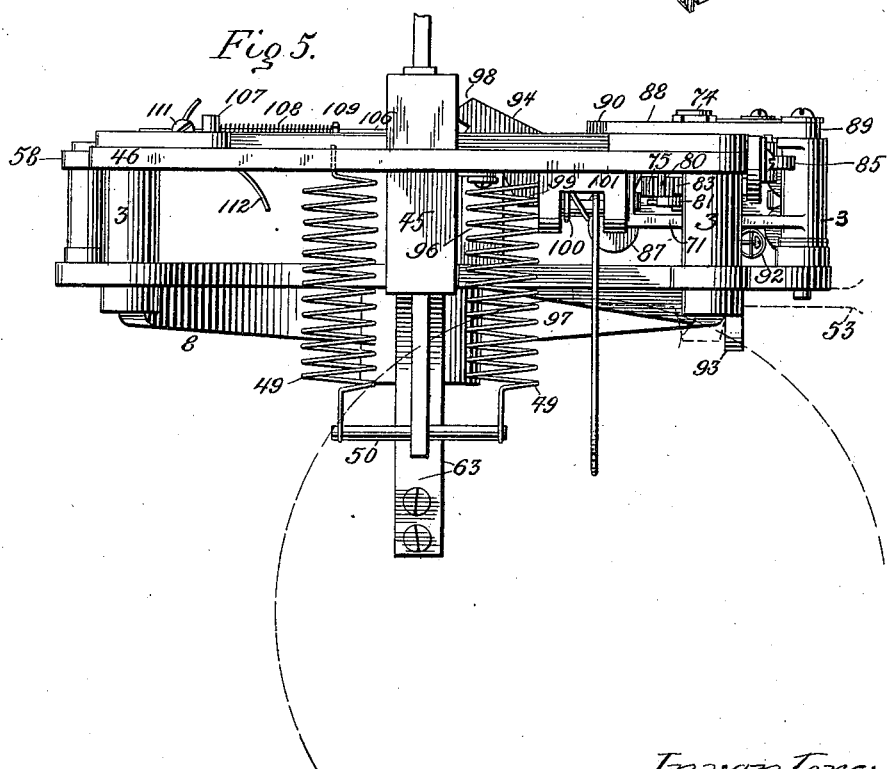

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 6.

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 7.
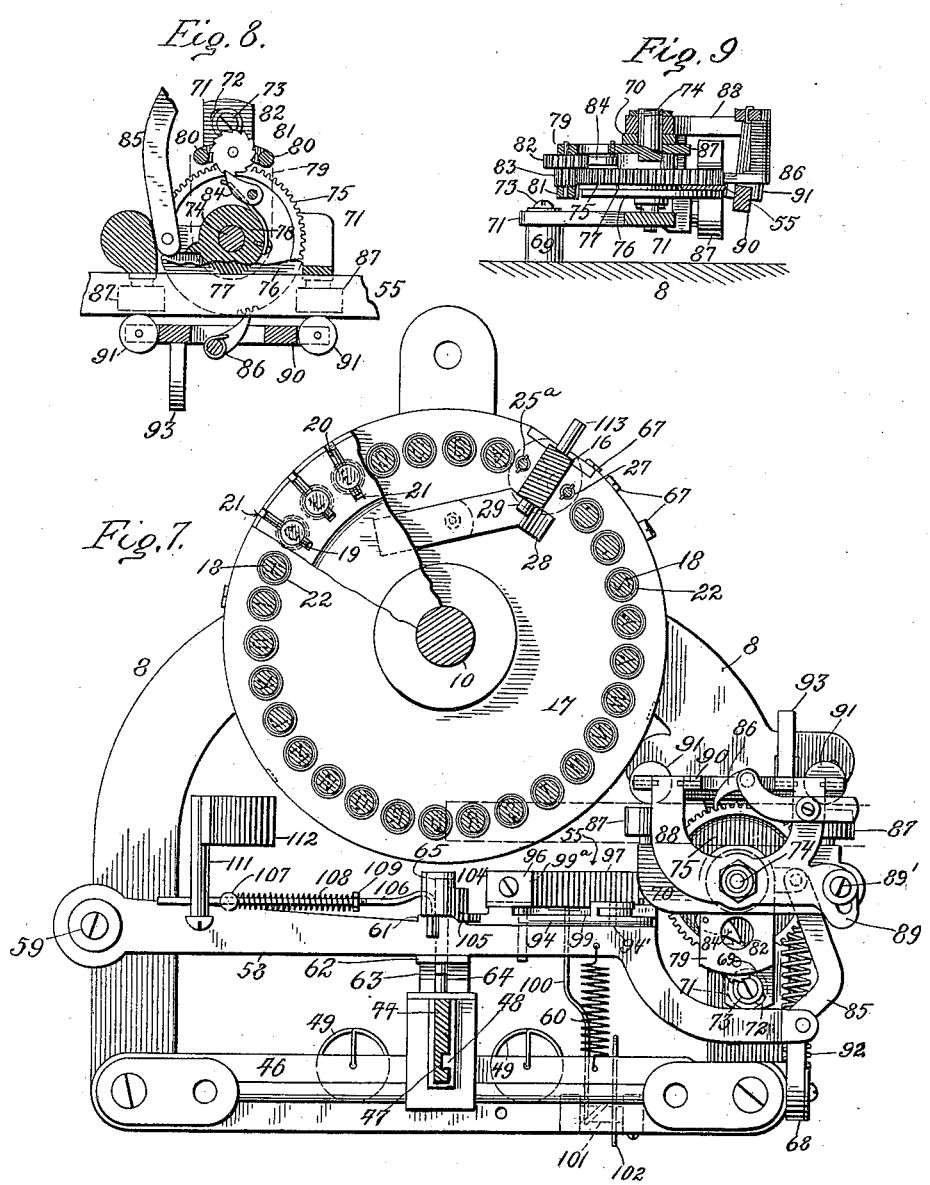

No. 687,168. Patented Nov. 19, 1901.
A. W. & A. H. ROOVERS.
COIN CONTROLLED DIE PRESS.
(Application filed May 14, 1901.)
(No Model.) 8 Sheets—Sheet 8.

Attest:
D. E. Burdine
J. M. Pond

Inventors:
Alfred W. Roovers and
Alexander H. Roovers,
by Dodge and Sons,
Atty's.

UNITED STATES PATENT OFFICE.

ALFRED W. ROOVERS AND ALEXANDER H. ROOVERS, OF BROOKLYN, NEW YORK.

COIN-CONTROLLED DIE-PRESS.

SPECIFICATION forming part of Letters Patent No. 687,168, dated November 19, 1901.

Original application filed November 9, 1900, Serial No. 35,932. Divided and this application filed May 14, 1901. Serial No. 60,238. (No model.)

*To all whom it may concern:*

Be it known that we, ALFRED W. ROOVERS and ALEXANDER H. ROOVERS, citizens of the United States, residing at Brooklyn, in the county of Kings and State of New York, have invented certain new and useful Improvements in Coin-Controlled Die-Presses, of which the following is a specification.

Our invention relates to a novel machine for producing labels or name-plates suitable to be placed in hats, applied to boxes, tools, implements, and the like, or when of suitable size used as signs.

The invention will be best understood upon reference to the accompanying drawings, wherein—

Figure 1:
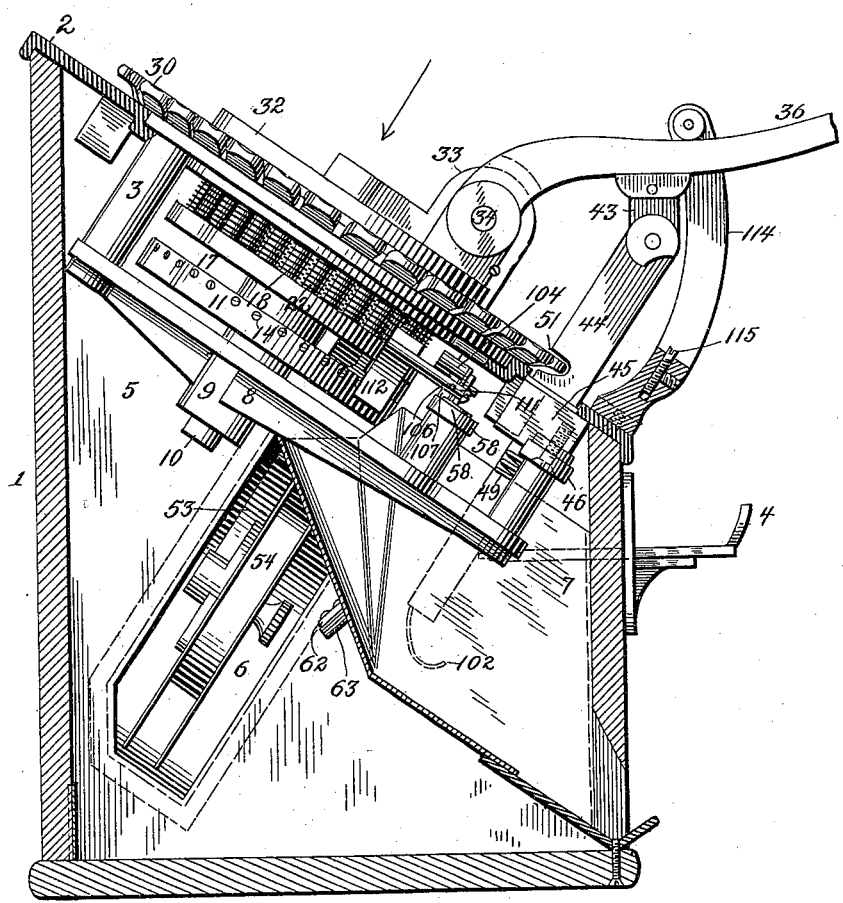
Figure 11:
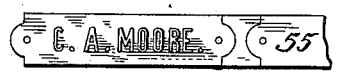
Figure 6:
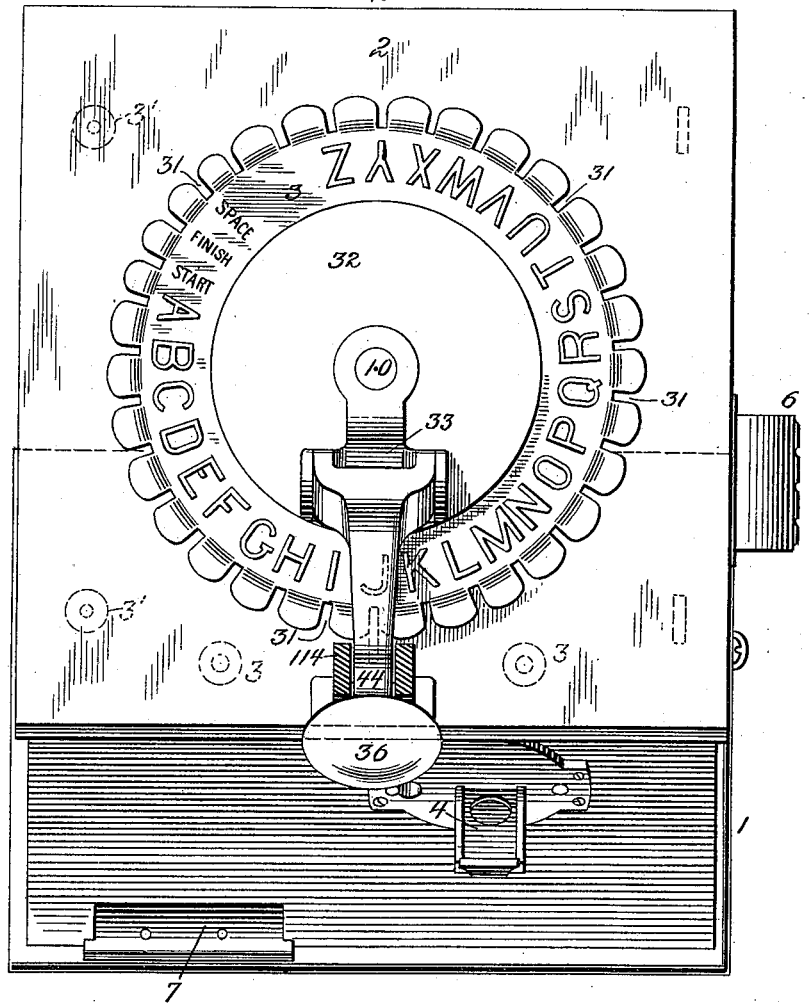
Figure 13:
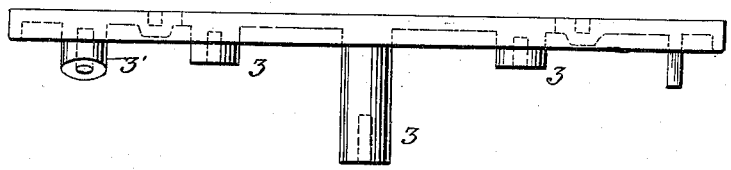
Figure 12:
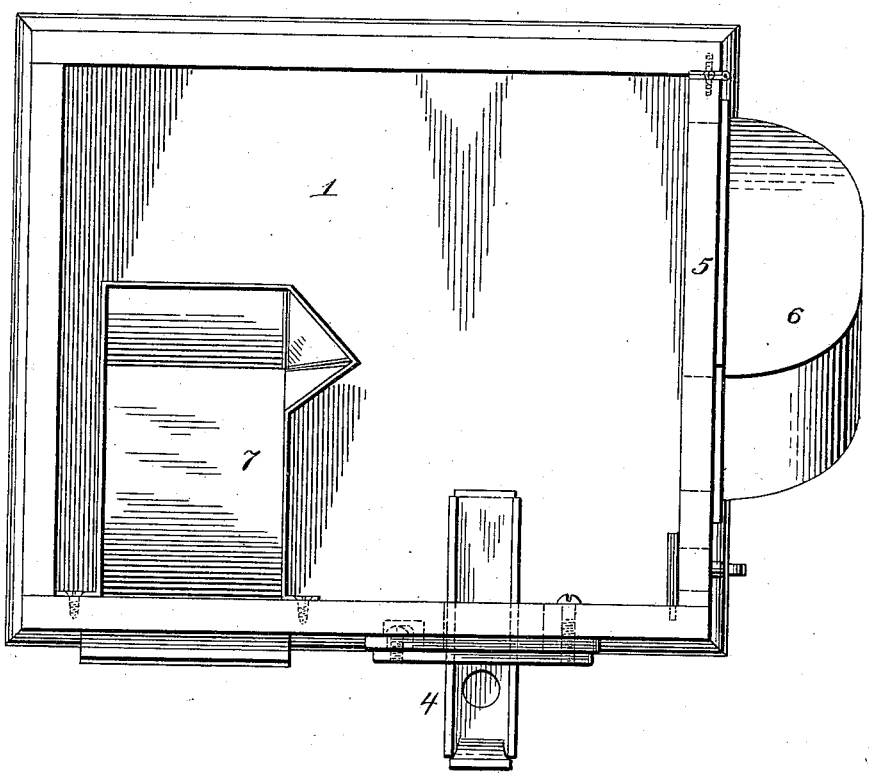

Figure 1 is a side elevation of the entire mechanism with the side of the supporting-casing removed in order to expose the interior arrangement to view; Fig. 2, a side elevation of the mechanism, partly in section; Fig. 3, a longitudinal vertical section; Fig. 4, a side elevation looking from the interior toward the front or actuating side of the mechanism; Fig. 5, a front elevation of the same, portions of the device being omitted; Fig. 6, a perspective view of the mechanism and the casing looking down in the direction indicated by the arrow, Fig. 1; Fig. 7, a top plan view of the mechanism, partly in section, with the index-plate removed; Figs. 8 and 9, detail views of the strip-feeding mechanism; Fig. 10, a perspective view showing in detail certain portions of the releasing and locking mechanism; Fig. 11, a plan view of one of the completed strips, showing the name embossed thereon; Fig. 12, a top plan view of the casing with the cover-plate removed; Fig. 13, an end view of the plate; Fig. 14, a perspective view of a locking-dog hereinafter described.

The object of our invention, stated generally, is to produce a simple and efficient mechanism capable of forming in or upon a strip or sheet of metal or other suitable material letters, figures, or other characters in any desired order or arrangement.

The invention is susceptible of varied embodiment, but is here illustrated in a form more particularly intended for general use by the public upon the insertion or deposit of a coin or token.

Among other features of special importance may be noted a die which after the machine is properly started simultaneously finishes and perforates the end of a lettered plate, severs said plate from the strip, and shapes and perforates the new end of the strip for the commencement of another plate, spacing mechanism for properly spacing letters of varying width, and automatic trip and locking devices for preventing continuous or undue working of the machine without proper deposit of coins or tokens.

Other features will be explained in the following description and will be pointed out in the claims.

Referring to the drawings, 1 indicates the casing, provided with a cover or top plate 2, the top plate being shown in Figs. 6 and 13 with a central opening and with lugs 3 for supporting the mechanism below the plate. Said cover is also provided with downwardly-projecting lugs 3', which afford ready means of attachment for the cover or top plate to suitable brackets or the like secured to the interior walls of the casing. Extending through the forward side of the casing or at any convenient point is a coin-slide or carrying device 4, of any suitable construction, which may be operated in a manner similar to that shown and described in Letters Patent of the United States, No. 449,749, granted to A. W. Roovers under date April 7, 1891. The function of this slide is to carry a coin into the casing and to enter into operative relation with the releasing mechanism to be hereinafter described. The casing is also provided with a door 5, Figs. 1 and 12, to afford access to the interior of the box for withdrawal of the deposited coins and for the insertion of a new spool or strip of metal. The door also carries in the form shown a casting 6 for the reception of the slack of the strip as it may unwind from the reel, which is mounted within the casing. The casing also supports a chute 7 (shown in Figs. 1, 6, and 12) for the reception and delivery of the complete name-plate or strip. The mechanism is supported by a frame or casting 8, which is provided with suitable holes that register with the screw-threaded holes formed in the lugs 3. Said frame or casting is provided with a hub 9, within which is seated and secured a shaft or spindle 10, said shaft extending up above the cover or top plate of the casing. Upon said shaft is rotatably mounted a die-carrier and index-plate, the die-carrier and plate being secured together, so as to rotate as one and bring the selected die or punch beneath a cam, which cam is operated by a handle or lever placed upon the outside of the machine.

Referring in detail to the construction of the parts just alluded to, 11 denotes a disk or plate forming the lower part of a turret or head and carrying a series of female dies 12, each die being held in position by two screws 13 and 14, one acting below to give proper elevation and the other upon the side thereof to lock the die in its adjusted position. The dies 12 may bear any signs or characters desired. Said plate or disk 11 also carries and supports a female die or member 15, which works in conjunction with a corresponding die or punch 16. Attached to and moving with said disk 11 is the upper portion or head 17 of the turret, having mounted therein a series of male dies or punches 18, the faces of said dies corresponding to the complemental female dies 12, occupying positions directly below them in the plate 11. In the drawings the stems of the dies 18 are shown cylindrical in form and guided by pins 19 and 20, extending transversely through their upper ends and working in slots or openings 21, formed in the upper portion of the turret or carrier 17. The dies are held in their elevated positions by springs 22, which surround said dies, as best shown in Fig. 3. In practice the stems of the dies may be made polygonal in form and the guiding-pins dispensed with, if so desired. Pins 19 act also as stops to prevent the springs from elevating the dies too high.

The punch 16 is shown in detail in Fig. 10 and is so shaped on its lower or working end as to cut the strip of material which is passed through the machine, as shown in Fig. 11, wherein it will be noted that the end of the strip is provided with a rounded projection having a hole or perforation formed therein. The perforations in the rounded ends are produced by the action of the rounded pins or punches 23, working in conjunction with the openings or perforations 24, formed in the lower or female die 15. The die or punch 16 passes down through a plate 25, provided with openings corresponding in form to the die and its punches 23, said plate being held in a recess or socket formed in the under face of the turret-head 17, Fig. 3, and maintained in such position by spiral springs 25ª, which bear against the face of the turret, and cross-pins 26, carried by stems or posts 27, which extend up through the under face of the turret. As will be noted upon reference to Fig. 10, the punch or die 16 is formed with a shoulder or projection, which when the punch is depressed a predetermined distance contacts with the plate 25 and carries the same down with it. The office of this plate is to act as a clearer for the finishing-die and its punches 23. The die or punch is maintained in its elevated position by a spring 28, Figs. 3 and 7, which acts against the under face of a pin 29.

Secured to the upper part of the turret or head-block 17 is an index-plate 30, the periphery of which is provided with a series of radial slots 31. Opposite each of the slots is a letter or other character similar to that carried by the die located in line with said slot, or, in other words, the plate, as its name indicates, is an index for the dies, and by rotating the same the desired die may be brought into proper position relative to the strip of material upon which the letter or other character is to be embossed or imprinted.

Mounted on the upper end of the shaft or spindle 10 and rigidly affixed thereto is a cover 32, the depending flange of which fits over a corresponding upstanding flange formed on the index-plate 30, preventing access to the upper ends of the dies and also protecting the same against injury from the elements or otherwise. Said cover 32 is provided or formed with a hollow housing or projection 33, through the side wall of which extends a shaft 34, carrying a cam 35 of the form best shown in Fig. 3. The shaft is connected at its ends to an operating-lever 36. The cam, as will be noted upon reference to the figure just mentioned, bears upon a roller 37, mounted in a groove or recess in the upper face of a block 38, pivotally connected to the housing. Said block, as will be noted, is split and provided with a transversely-extending pin 39, into which is screwed a taper pin or screw 40. As will be readily understood, by turning the screw inward the block is expanded, and consequently its height varied. The lower free end of said block stands in line with the upper ends of the dies carried by the turret, and when the parts are in position for operation the die to be used stands directly under said block and is depressed thereby as the operating-lever 36 is forced downward. The block 38 is held in its elevated position by a spring 42, Fig. 3, which bears on its under side. Preferably the front portion of the housing 33 will be closed.

From the foregoing description it will be seen that any die may be brought or moved around into a position beneath the block, which can then be forced downward by the operating-lever 36 to emboss the strip of material which is extended in between the upper and the lower die.

Connected to the operating-lever by a link 43 is a slide 44, which passes down through a box or bearing 45, formed upon or carried by a cross bar or member 46, attached to the spider or frame 8, as shown in Figs. 1, 2, 3, 5, and 7. Preferably the slide will be provided with a groove or channel 47 to receive a guiding rib or feather 48, formed in or carried by the box or bearing 45, as seen in Fig. 7. The slide 44 is normally held in its elevated position by two coiled springs 49, connected to a cross bar or pin 50, extending out laterally from the lower end of said slide 44 and connected at their upper ends to the cross bar or support 46, as shown in Figs. 4 and 5. The slide is provided with a recess or notch 51 of such size and shape as to permit the free rotation of the index-plate therethrough, as indicated in Figs. 2 and 3. Normally the slide stands in such position that the recess 51 registers with the edge of the index-plate, permitting rotation thereof. The lower end of the slide is preferably reduced in width and provided with an inclined face 52 at a point above said reduced portion, as shown in Fig. 3.

Secured to the under face of the framework 8 is a curved arm 53, which serves to support a reel 54, upon which the strip of material 55, such as aluminium, is wound. The strip passes from the reel over rollers 56 and 57, the latter of which is adjustable, as indicated in Fig. 4, in order to bring the strip into proper position relatively to the strip-feeding mechanism. The strip-feeding mechanism is operated by a lever 58, pivoted at 59 to the supporting frame or casting 8, as best illustrated in Fig. 7. Normally the lever 58 is held out toward the slide 44 by a spring 60. Secured to one face of a downwardly-extending block 61, formed on said lever, is an arm 62, Figs. 2 and 3, the lower end of which is bent or inclined slightly away from the operating-slide 44. To said arm 62 there is attached a spring-arm 63, preferably of leaf form and held in its adjusted position by a bolt 64. The upper end of said spring-arm 63 is curved away from the slide 44, against which it bears. The action of the arm 62 in conjunction with the slide is to force the lever 58 over toward the dies or turret-head when the hand-lever 36 is depressed, the inclined or cam face 52 of said slide bearing against the upper end of the spring-arm 63 and forcing it, with the lever 58, inwardly. The block 61 carries at its lower end an adjustable pin 65 in line with the lower disk or plate 11, which carries the lower or female dies.

As is well known, certain letters or characters require a greater space in the line than others, and to provide for proper proportionate feed of the strip the disk is formed with recesses and projections, which receive or arrest the pin 65 at different points in its range of movement to permit greater or less throw of the feed-lever 58. For instance, if the letter "M" is to be produced upon the strip, a feed of the strip equal to the space occupied by said letter must be had. Consequently, as indicated in Fig. 3, the disk 11 is provided opposite or in line with said letter with a recess 66, into which the pin 65 may enter. Thus it will be seen that the feed-lever 58 may be thrown over a greater distance at this than at points where thinner letters are located, and this by reason of the pin 65 entering said opening 66. In order to secure a proper adjustment of the parts, a screw is advisably mounted in said opening 66, and it is against this that the end of the pin 65 abuts. Where the letter or character occupies but a small space—as, for instance, the letter "i" or a period—pins may be arranged to project from the disk 11, by which the pin 65 may be arrested when said character is brought to position for operation. Such adjustable pins or screws are shown in Fig. 7 and indicated by the reference-numeral 67. It will be noted that by the employment of the spring-arm 63 between the operating-slide and the feed-lever 58 a greater or less motion of the feed-lever may be had without any variation in the length of stroke of the operating-slide 44 and its operating-lever 36. The extent of outward movement of the operating-lever 58 is determined by an adjustable stop or cam 68, secured upon or to the cross-bar 46, Figs. 2 and 7. The strip-feeding mechanism is connected to and operated by the free end of the lever 58.

Extending up from the supporting frame or casting 8 is a post or column 69, upon which is mounted a suitable frame, comprising an upper member 70 and a lower member 71. The lower member is provided with a forward extension and has a slot 72 formed therein, through which passes a fastening screw or bolt 73, the slot permitting adjustment of the frame with relation to the other parts and the screw serving to fix it in its adjusted position. Mounted between and carried by the members 70 and 71 is a shaft 74. Said shaft carries a gear-wheel 75 and the guiding-disk 76, between which and of a smaller diameter is a thin wheel or disk 77, having its periphery milled or roughened. The gear 75, the disk, and the milled wheel or disk 77 rotate as one. Above said gear 75 there is mounted upon the shaft a bell-crank lever 78, one arm 79 of which extends out beyond the edge or periphery of the gear 75 and has secured to it by studs or posts 80 a cross bar or member 81. Between the outer end of the arm 79 and the cross-bar 81 are arranged a ratchet-wheel 82 and a pinion 83, the pinion meshing with the gear 75. The pinion and ratchet-wheel 82 rotate as one; but rotation in one direction is prevented by the employment of a spring-pressed dog or detent 84. The outer end of the arm 79 of the bell-crank lever 78 is connected to the free end of the feed-operating lever 58 by a link or bar 85.

From the foregoing description it will be seen that as the feed-lever 58 is forced or moved inward it swings lever 78 about the shaft 74 as a center and would cause the pinion 83 to be rolled about the periphery of said gear and rotated about its own axis were it not that the pawl or dog 84 engages ratchet 82 and precludes such rotation. As a consequence the pinion and gear are locked together, and the lever 78, in which the pinion is mounted, carries with it the gear-wheel 75, causing the latter, and consequently the milled disk 77 and guiding-disk 76, to make a partial rotation and to advance the strip 55 a proportionate distance. On a return movement of the lever the spring-pawl 84 will permit a backward rotation of the ratchet 82 and the pinion 81, and consequently these parts will rotate, while the gear 75 is held against rotation by a spring-pressed dog or pawl 86, which engages it upon its opposite side. This arrangement effectually precludes any overthrow by reason of momentum or otherwise and also permits a more accurate and minute division and perfect determination of the movements of the milled disk in feeding direction than would be practicable with a dog or pawl acting directly upon wheel 75.

To prevent the strip from buckling as it passes between the gear 75 and the disk 76, rollers 87 are employed, the rollers turning upon spindles or axles extending in plane with the opposing faces of the gear 75 and the disk 76, or, in other words, standing at right angles to the milled edge of the disk 77.

To insure proper contact of the edge of the strip with the milled disk, there is employed a frame 88, which is pivoted on the upper end of the spindle or axle 74, a slight swinging movement and adjustment of the frame being permitted by reason of its slotted end 89 being clamped by a binding-screw 89'. From the outer ends of the arms of the frame there is suspended a yoke 90, carrying two rollers 91, one at each end, which lie in the same horizontal plane as the milled disk, and consequently bear against one edge of the strip as it passes through the feed mechanism. The yoke or frame 90 is held up against the strip by a spring 92. Said yoke or frame is likewise provided with a downwardly-projecting arm 93, which facilitates the manual swinging out of the frame and the proper adjustment of the same to permit ready insertion of the strip when the machine is being first made ready for operation. It will be seen that by having the frame 88 adjustably mounted the rollers 91 may be positioned so as to insure proper feeding of the strip between the dies.

From the foregoing it will be seen that the rollers 87 bear upon the under and upper faces of the strip both as it is presented to and leaves the milled wheel or disk, while the rollers 91 bear upon the outer edge of the strip and hold it in close contact with the milled disk. The strip, as above pointed out, also passes in between the under face of the gear 75 and the upper face of the disk 76. Thus the strip is supported and held to its proper position and is precluded from buckling or becoming displaced, but is properly directed to its position between the dies.

The feed-operating lever 58 is normally held out of action by a gravitating dog 94, which is pivotally connected thereto at 94', as is best illustrated in Fig. 10. When the parts are locked and the machine is held against movement, the dog 94 or a lug 95 formed thereon lies between the face of the feed-operating lever 58 and an upright stud or post 96, which is formed integral with and extends upwardly from a projection or arm 97, formed on or as a part of the supporting frame or casting 8. The lug 95, as will be noted upon reference to Figs. 10 and 14, is provided with a beveled face 98, preferably serrated, which acts in conjunction with a knife-edged plate $99^a$, mounted upon the upper end of the post or standard 96. Until the gravitating dog 94 is raised clear of the post, or, in other words, until the beveled face is clear of the knife-edge, the operating-lever cannot be moved inwardly far enough to properly actuate the parts, the knife-edge biting into the beveled face and preventing the gravitating dog from jumping or moving upward. Suspended from the dog is a gravitating block 99. Extending out from said block toward the front of the machine is a wire 100, which is coiled about a pin 101, the free end of the wire 102 extending out into proper relation with the coin-slide 4, so that when a coin is properly inserted and the slide manipulated the end of slide will engage the forward end of the bell-crank lever, comprising the wires or arms 100 and 102, rocking the same about its pivot 101 and elevating the block 99, together with the dog 94, throwing said dog up into the position shown in Fig. 10 and carrying the free end of the block upward between lever 58 and plate $99^a$ of post 96. In said figure the block 99 is shown as having raised the dog and dropped back to its normal position, in which relation it may pass freely by the post or standard 96, which post is cut away to permit the block to swing by it when lowered. The office of block 99 is to prevent the machine from being worked surreptitiously or without payment by pressing in the coin-slide and holding the same in after the coin has dropped therefrom. The inner end of the slide, as above explained, pressing against the lever 102 throws up the wire 100 and causes the block 99 and dog 94 to swing upward, said block 99 being carried to a position between the lever 58 and the post 96 or its top plate $99^a$. So long as the slide remains at its inward adjustment or in contact with arm 102 block 99 will be held in the position noted and inward movement of lever 58 will be precluded; but upon retraction of the slide the block will drop to the position indicated in Fig. 10, where it will clear the post and permit vibration of the lever. Without the block 99 the machine could be worked freely after once pushing in the slide with its coin if the slide were not retracted, because the dog 94 would be held up and the space between lever 58 and post 96 would be clear, permitting free vibration of the lever. The function of the coin in the coin-slide is to release a pawl and allow the slide to pass a certain distance inward, as will be noted upon reference to the patent above mentioned. Further description of this mechanism is unnecessary herein.

To maintain the gravitating locking-dog 94 in position, there is pivotally connected to the feed-operating lever a post 103, which normally stands in a vertical position. Said post 103 carries at its upper end an inclined plate 104, having a lip or projection 105 extending outward therefrom at approximately right angles thereto, said lip being in such position and bearing such relation to the gravitating dog 94 that when said dog is elevated, as above described, the lip 105 will be thrown back by and shall drop forward beneath the free end of the dog, as indicated in Fig. 10. Extending out from the rear of said inclined plate or face 104 or from the post 103 is a rod or bar 106, which passes freely through a stud 107, extending upwardly from the feed-operating lever, said bar being pivotally connected to said post. A coiled spring 108 encircles the rod between the post and a nut or shoulder 109 placed thereon. Said spring normally presses the post 103 toward the gravitating dog 94, so that when said dog is elevated into the position shown in Fig. 10 the lip or projection 105 will pass thereunder. A stop 110, Fig. 4, is employed to prevent the post 103 from being thrown too far when the gravitating dog and its pivoted block 99 are down in position to lock the feed-operating lever against movement. Such position is shown in dotted lines in Fig. 4 and in full lines in Fig. 7. To the rear end of the rod 106 there is adjustably attached an arm 111, which in turn has attached to its outer end a plate 112, preferably of the form shown in side elevation in Fig. 4. The function of this plate 112 is to prevent the machine being operated continuously, for, as will be readily seen, if the end of the strip which is fed through the machine comes in contact therewith it will force said arm, with the rod 106, back against the tension of the spring 108, withdrawing the nose or arm 105 from beneath the gravitating dog 94, permitting said dog to drop down between the post or standard 99 and the feed-operating lever 58, preventing the machine from being operated again until said gravitating dog and its block 99 are elevated either by the insertion of a coin or token or in some other desired manner.

The finishing-die 16, which is designed to be brought into action when the name has been embossed on the strip, is provided with a pin or stud 113, which projects out therefrom in line with the inclined face or plate 104 of the lever or post 103, so that when said finishing-die 16 is depressed said pin or stud 113 will force the lever or post 103 backward, withdrawing its lip 105 from beneath the gravitating dog 94, permitting the dog to drop down between the standard or post 96 and the feed-operating lever 58. The curved plate 112 serves to catch the forward end of the advancing strip and to direct it upward and hold it above the lower dies if there be any tendency to sag or curl downward.

Mention has been made of the beveling or inclination of the side face of lug 95 of locking-dog 94. The reason for such beveling is that were the lug left of the full width of its upper end it could fall into the space between lever 58 and post 96 or its plate 99$^a$ only when said lever should be at its extreme outward limit of movement. It is, however, important that when the supporting-lip 105 is withdrawn from beneath the dog 94 said dog shall be free to enter between the lever 58 and post 96, however narrow may be the space at that moment, because if the lever were required to move fully outward before the dog could lock it the punch might be lowered sufficiently to sever a plate and the lever be vibrated almost its entire distance or just enough less to cause lug 95 to maintain a hold or bearing, however slight, upon the top of post 96 or plate 99$^a$, which could hold the dog out of action. Under such manipulation the strip could be fed and cut off in lengths as great as permitted by the trip 112 until exhausted or could be fed and permitted to curl up within the machine. By beveling the lug 95, however, it is caused to enter the space between lever 58 and post 96 the instant it is released by support 105. The serration of the face of lug 95 causes the dog to be more firmly caught and held by the edge of plate 99$^a$ and lessens the chance of its being surreptitiously raised or raised at all until all parts are restored to normal position. From this it will be seen that the machine is automatically locked against further movement when a name-plate is completed. At the same time the end of the new strip or name-plate is formed, as best indicated in Fig. 11.

As will be seen upon reference to Fig. 1, a guide arm or yoke 114 is mounted on the top plate 2 and prevents too great a movement of the lever in an upward direction and brings the notch 51 of the operating-slide 44 into proper position with relation to the index-plate. The yoke is also provided with an adjustable pin or stud 115, which serves to limit the downward movement of the operating arm or lever 36.

The operation of the machine is as follows, assuming that the coin-controlled mechanism is to be used: The parts being in the position indicated in full lines in Fig. 7 or in dotted lines in Fig. 4, wherein the gravitating dog 94 is holding the feed-lever against movement, the person desiring a name-plate or the like will deposit a coin in the slide 4, and when the slide is properly manipulated it will come into contact with the arm 102, thereby causing the arm 100 to elevate the block 99, carried by the gravitating dog 94. When the dog 94 is elevated the nose 105 of post 103 will drop or move thereunder, as above described, holding it in an elevated position. As the coin-slide moves back from the arm 102 after the coin is deposited in the receptacle below the block 99 will fall by gravity into the position shown in Fig. 10, and the parts will be in position for operation. The index-plate is then brought around to the position designated "Start," and the operating-lever is depressed. This will feed the strip forward one space, bringing it into proper position for the embossing of the first letter of the name. Taking, for example, the name given in Fig. 11, the index-plate is brought around to the position where the letter "C" will register with the operating-lever and the lever be depressed. The period is then brought to register with the operating-lever, which is again depressed. For each depression of the lever the spring-arm 63 will be thrown forward by coming in contact with the cam-face 52, and through the action of said spring-arm 63 with the rigid arm 62 the feed-operating lever will be thrown toward the turret-head and the feed mechanism actuated. The parts are so proportioned and the movements so timed that the strip is fed forward during the first part of the downward movement of the operating-lever and comes to rest before the dies act thereon. As the slide is elevated through the action of the springs 49 the pressure of the spring-arm 63 on the feed-slide 58 is relieved, and the spring 60 draws the feed-operating arm or lever outward into a position where the feeding mechanism is again ready to advance the strip another space. This operation is continued until the desired name has been printed or embossed on the strip, the depressions or recesses 66 in the turret-head and the projecting pins or studs 67 determining the proper range of movement of the feed-lever, and consequently an exact feed of the strip to bring about a proper spacing of the letters embossed on the strip. As above pointed out, the spring-arm 63 permits a full descent of the lever and actuating-slide 44 to bring the dies into operation and at the same time compensate for the difference in throw of the feed-operating lever, as just noted. After the last period has been formed on the strip the operator brings the index-plate around to the space designation and then depresses the lever. This will feed the strip forward to give the required space after the name and before the finishing-die is brought into operation. The finishing-die is then brought to position and the lever is depressed, the die severing the finished name-plate from the strip, at the same time, owing to the shape of the die, forming the forward end of the next name-plate and the stem punching it. As the finishing-die is moved downward the pin or stud 113 carried thereby comes in contact with the inclined face-plate 104 of the lever or pivoted arm 103 and withdraws the same from beneath the gravitating locking pawl or dog 94, thus permitting said dog to fall to locking position and preventing further operation of the feed mechanism until the parts have again been reset.

In order to prevent the continuous formation or repetition of a name on a long strip, which could be done if the finishing-die were not brought into operation, the plate 112 is employed. As will be seen, the plate permits what may be termed a "maximum" feed of the strip through the machine; but when the end of the strip comes in contact with said plate and moves the same it will draw the arm 103 backward, releasing the locking dog or pawl 94, and thus preventing further operation of the feed mechanism.

The material of which the strip is made may of course be varied to suit requirements. Aluminium has been found to give very satisfactory results, though silver, copper, and the like may be employed.

As above intimated, the embodiment of the invention here illustrated and specifically set forth is but one of various forms the mechanism may take without departing from the spirit or scope of our invention. Thus it is obvious that the form and the path or direction of movement of the index-plate 30 and die carrier or turret are immaterial provided the dies be carried thereby to the proper position to be acted upon by the lever 36 and intermediate parts. Hence while the circular form and rotary movement are deemed most satisfactory we do not mean to exclude from our claims straight, curved, or sector-shaped index-plates and die-carriers, but regard the same as the mere and obvious mechanical equivalents of the circular parts here shown. The die stems or stocks may of course be polygonal instead of cylindrical. Flat or leaf springs may be employed instead of spiral springs to elevate the dies, and other modifications falling within the province of the mechanic may of course be made, these and like variations involving merely election from among common and well-known equivalents in machine elements.

This application is a division of our application filed November 9, 1900, Serial No. 35,932.

Having thus described our invention, what we claim is—

1. In a machine of the character described, the combination of a rotatable turret carrying a series of dies; means for operating said dies; a strip-feeding mechanism; a yielding operative connection intermediate said strip-feeding mechanism and the means for operating the dies; means for locking the strip-feeding mechanism out of operation; and means for releasing said locking means.

2. In a machine of the character described, the combination of a suitable supporting-frame; a rotatable turret carrying a series of dies; means for operating said dies; a strip-feeding mechanism; means for limiting the throw or movement of said strip-feeding mechanism according to the letter or character to be imprinted or formed on the strip; a locking device for preventing the movement of said strip-feeding mechanism; a yielding operative connection intermediate said strip-feeding mechanism and the die-operating means; and means for releasing the locking device.

3. In a machine of the character described, the combination of a suitable frame; a rotatable turret carrying a series of dies; means for operating said dies; a strip-feeding mechanism; means for operating said strip-feeding mechanism; a locking device to prevent the operation of said strip-feeding mechanism; means for bringing said locking device into operation as the final die is brought into action or the strip is fed through the machine a predetermined distance; and coin-controlled mechanism for releasing the locking device.

4. In a machine of the character described, the combination of a series of dies; a strip-feeding mechanism adapted and arranged to feed a strip into operative position with relation to said dies; a locking device for preventing the operation of said strip-feeding mechanism; means for bringing said locking device into position to prevent the operation of the strip-feeding mechanism when the final or finishing die is brought into operation or the strip has been fed through the machine a predetermined distance; and coin-controlled mechanism for releasing the locking device.

5. In a machine of the character described, the combination of a suitable frame; a rotatable turret carrying a series of dies; means for operating said dies; a strip-feeding mechanism; a locking device for said strip-feeding mechanism; means for holding said locking device against operation, adapted to be withdrawn from engagement therewith as the finishing-die is brought into operation or the strip has been fed through the machine a predetermined distance; and coin-controlled mechanism for releasing the locking device.

6. In a machine of the character described, the combination of a suitable frame; a rotatable turret carrying a series of dies; means for operating said dies; a strip-feeding mechanism; a gravitating dog or pawl for holding said strip-feeding mechanism out of operation; means for holding said pawl in its elevated position; means for releasing said pawl as the finishing-die is brought into operation or the strip has been fed through the machine a predetermined distance; and coin-controlled mechanism for releasing the gravitating dog or pawl.

7. In a machine of the character described, the combination of a suitable supporting-frame; a revoluble turret carrying a series of dies; means for operating said dies; strip-feeding mechanism; a lever for operating said strip-feeding mechanism; a yielding operative connection intermediate said lever and the die-operating means; a fixed post or standard extending from the frame or a fixed portion of the machine; a dog carried by said lever and arranged to occupy a position between said lever and said post or standard; means for elevating said dog; means for holding said dog in its elevated position; and means for releasing said dog and permitting it to pass between said post and the operating-lever when the finishing-die is brought into operation or the strip has been fed through the machine a predetermined distance.

8. In combination with a machine of the character described, a suitable casing inclosing the working parts thereof; a series of dies carried by said machine; an operating-lever for said dies extending outwardly from the casing; a strip-feeding mechanism; connections intermediate said strip-feeding mechanism and the die-operating lever; a lock for holding said strip-feeding mechanism out of operation; and means mounted in the casing and accessible from without for releasing the locking device.

9. In a machine of the character described, the combination of a suitable frame; a rotatable turret mounted thereon carrying a series of dies having characters formed thereon to be printed or embossed on the strip; a finishing-die also carried by said turret; a strip-feeding mechanism; a lock for holding said strip-feeding mechanism out of operation; means for holding said lock out of operation while the characters or letters are being embossed; means carried by said finishing-die for releasing said lock and bringing it into operative relation with the strip-feeding mechanism, whereby the strip cannot be further fed through the machine until the parts have been reset; and coin-controlled means for controlling the lock.

10. In a machine of the character described, the combination of a suitable frame; a rotatable turret carrying a series of dies having the characters to be embossed upon a strip formed thereon; a finishing-die also carried by said turret; a strip-feeding mechanism; a lock for holding said strip-feeding mechanism out of operation; means for moving said locking device out of operative relation with said strip-feeding mechanism; means for maintaining said locking device in such position; and means carried by the die for restoring the lock to its operative position with reference to the strip-feeding mechanism.

11. In a machine of the character described, the combination of a suitable frame; a rotatable turret carrying a series of dies; means for operating said dies; an operating-slide connected to said means; a strip-feeding mechanism; a lever for operating said strip-feeding mechanism; connections intermediate said lever and the operating-slide; a gravitating locking device carried by said lever; means for elevating said locking device; means for maintaining said locking device in its elevated position; and means for releasing said locking device when the finishing-die is brought into operation or the strip has been fed through the machine a predetermined distance.

12. In a machine of the character described, the combination of a suitable frame; a rotatable turret mounted thereon; a series of dies carried by said turret; means for operating said dies; a feeding mechanism carried by the frame; a lever pivoted to the frame and connected to said feeding mechanism; a slide connected to the die-operating means; yielding connections intermediate said slide and the feed-lever; a locking device for said feed-lever; and means for throwing said locking device out of and into operative relation with said lever.

13. In a machine of the character described, the combination of a suitable frame; a rotatable turret mounted thereon carrying a series of dies; an index-plate connected to said turret and having a series of slots formed in its periphery opposite the notations formed thereon; an operating-lever for said dies; a slide 44 connected to said operating-lever and working in a suitable box or bearing supported by the frame; a suitable strip-feeding device mounted on the frame; a feed-operating lever journaled on the frame and connected to the strip-feeding device; a yielding connection intermediate said lever and the slide; a locking device to prevent movement of said feed-lever; means for throwing said locking device out of operative relation with said lever; and means for bringing said locking device into operative position.

14. In a machine of the character described, the combination of a suitable frame; a turret rotatably mounted thereon and carrying a series of dies; a lever for operating said dies; a slide connected to said lever and provided with a cam-surface; a strip-feeding mechanism; a lever pivoted to the frame; connections intermediate said lever and the strip-feeding mechanism; a lock for normally holding said lever against operation; means for releasing the lock; and a yielding arm as 63 connected to said lever and bearing against the slide.

15. In a machine of the character described, the combination of a suitable frame; a turret rotatably mounted thereon and carrying a series of dies; an operating-lever for said dies; a second lever pivoted to the frame; connections intermediate said levers; a strip-feeding mechanism; means for normally holding said second lever out of operation and preventing actuation of the strip-feeding mechanism until the parts have been set; and a coin-controlled device for releasing said means.

16. In a machine of the character described, the combination of a suitable frame; a series of dies; means for operating said dies; a strip-feeding mechanism; a lever 58 connected to said strip-feeding mechanism; connections intermediate said lever and the die-operating means; a stop for said lever normally holding the same against action; means for elevating said stop; an arm 103 pivoted to said lever adapted and arranged to pass under said stop when the same is elevated, and to maintain it in such elevated position; a rod 106 connected to said arm 103; a spring for normally forcing said arm toward the locking device; and a plate 112 carried by said rod 106, substantially as and for the purpose set forth.

17. In a machine of the character described, the combination of a series of dies; a strip-feeding mechanism; a lever for operating said strip-feeding mechanism; a lock pivoted to said lever and provided with a beveled face; coin-controlled means for releasing said lock; a post or standard extending from a fixed portion of the machine; and a knife carried by said post or standard arranged to act in conjunction with the beveled face on the dog, substantially as described.

18. In a machine of the character described, the combination of a series of dies; a strip-feeding mechanism; an operating-lever for said strip-feeding mechanism; a fixed abutment; a pivoted locking device carried by the lever adapted to act in conjunction with said fixed abutment; means for preventing the operation of the lever until the pivoted locking device is raised entirely free of said abutment; and coin-controlled mechanism for releasing the locking device.

19. In combination with a machine of the character described, a suitable casing for supporting said machine and inclosing the working parts thereof; means for operating said machine; a locking device to hold said machine out of operation; and means carried by the casing adapted and arranged to receive a coin or token and to bring said coin or token into operative relation with the locking means whereby the parts may be released and the machine operated, substantially as described.

20. In a machine for producing labels, name-plates, and the like, the combination of a carrier; a series of dies mounted therein, said carrier being movable to bring each die to a common impression-point; a cut-off and finishing die, adapted and arranged to cut the name-plate from the strip, finish its end and at the same time form the forward end of the succeeding name-plate; mechanism, substantially as described, for operating the dies; a locking device for holding said machine out of operation; and coin-controlled mechanism for releasing the locking device.

In testimony whereof we have signed our names to this specification in the presence of two subscribing witnesses.

ALFRED W. ROOVERS.
ALEXANDER H. ROOVERS.

Witnesses:
J. M. DOREMUS,
EMIL HOEFLE, Jr.